Jan. 5, 1965  F. A. SEELIG ETAL  3,164,235
TOGGLE ACTUATED CLUTCH
Filed April 3, 1961
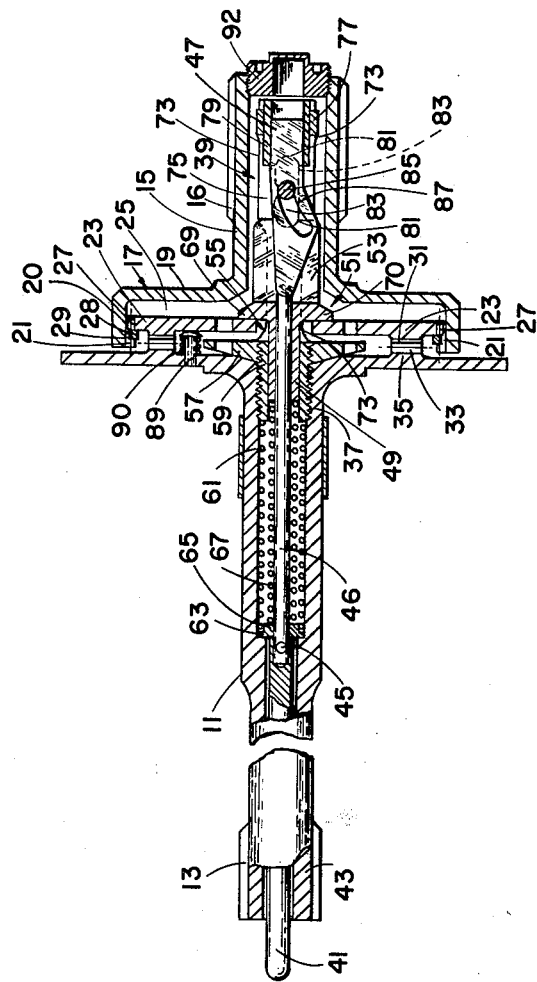
INVENTORS
FREDERICK A. SEELIG
NEAL ROTHFUSS
BY Robert W. Ely
ATTORNEY United States Patent Office
3,164,235
Patented Jan. 5, 1965

3,164,235
TOGGLE ACTUATED CLUTCH
Frederick A. Seelig, New Hartford, and Neal Rothfuss, Clinton, N.Y., assignors to The Bendix Corporation, Utica, N.Y., a corporation of Delaware
Filed Apr. 3, 1961, Ser. No. 100,245
6 Claims. (Cl. 192—101)

This invention relates to releasible coupling means and more particularly concerns such coupling means which is suitable for coupling an engine having an internally-splined output shaft to an accessory.

An object of the present invention is to provide an improved releasible coupling having curvic teeth wherein a small axial force component is effective to separate the curvic teeth when the locking means is released since a heavy splined drive shaft is not required to slide within an engine output member.

A further object is to provide an improved releasible coupling having curvic teeth wherein sliding of the coupling drive shaft within the internally-splined engine output shaft is eliminated whereby the danger of spline hang up due to excessive corrosion or steps worn in the engine output shaft is avoided.

Another object is the provision of an improved releasible coupling wherein a connecting plate having curvic teeth moves axially relative to a driven shaft and a drive shaft.

An additional object is the provision of an improved releasible coupling which has a connecting curvic-toothed plate splined to a cup-like flange of an engine-connecting drive shaft and has toggle locking means within the drive shaft.

A further object is to provide such a coupling having a connecting curvic-toothed plate wherein adequate travel clearance space for the plate is provided by limiting the axial spacing between the drive shaft and the driven shaft.

The realization of the above objects along with the features and advantages of the present invention will be apparent from the following description and the accompanying drawing.

The drawing is a partially-cross-sectioned side view of a releasible coupling embodying the invention and shows a driven accessory shaft at the left and an engine-connecting externally-splined drive shaft at the right with the shafts being connected by curvic teeth on a driven shaft flange and on a connecting plate which is splined to a cup-like drive shaft flange. The view shows the side of an axial cam plate of the toggle locking means within the drive shaft and an axial cam plate extension which connects to an actuator rod projecting at the left.

Referring to the drawing, the hollow driven quill shaft 11 extends to the left and has external axial splines 13 for connection to mating splines of a hollow, axially-fixed accessory shaft (not shown). Shaft 11 will extend through and be mounted in the surrounding accessory shaft carrying an accessory. Thus, when driven shaft 11 is rotated, an accessory such as a generator will be driven. For driving the axially-fixed driven shaft 11, the hollow engine-connecting shaft 15 having external splines 16 at the right is provided with a cup-like flange 17 which includes a radial flange part 19 and an axially-extending annular part 20. Annular part 20 has internal or female axial splines 21 which have an effective length equal to the clearance travel of curvic teeth to be described. An axially-movable flat connecting plate 23 is mounted in the recess 25 of the cup-like output flange 17 by means of peripheral splines 27 mating with splines 21 of annular part 20. A split lock ring 28 is mounted in an annular groove 29 in female splines 21 of annular part 20 so that leftward movement of connecting plate 23 is limited. The length of male splines 27 is slightly greater than the effective length of female splines 21 inward of lock-ring 28 so that the male splines 27 do not wear steps in the female splines 21 which would restrain plate 23. Connecting plate 23 has a ring of curvic teeth 31 adjacent its periphery which mate with curvic teeth 33 in a radially-extending input flange 35 at the input end 37 of the driven shaft 11. The curvic teeth 31 and 33 respectively in the facing input flange 35 and connecting plate 23 are held in engagement by releasible locking means 39 which is carried by driven shaft 11 and extends into the interior of drive shaft 15 to adjacent the engine end thereof.

The locking means 39 urges the axially-movable connecting plate 23 toward the axially-fixed output flange 35 so that curvic teeth 31 and 33 do not separate during transmission of torque derived from an engine (not shown) which is connected to externally-splined drive shaft 15. For releasing the locking means 39 so that the curvic teeth 31 and 33 will self-separate and connecting plate 23 will move axially to the right the required clearance travel, an actuator rod 41 is provided which extends beyond the left output end 43 of the driven shaft 11. Actuator rod 41 connects to the locking means 39 and suitable operating means (not shown) are provided for imparting rightward axial motion to the rod 41. It is apparent that, when the locking device 39 is released and connecting plate 23 moves to the right in the splines 21 of the cup-like flange 17 of the drive shaft 15 due to separation at the curvic teeth 31 and 33, the relatively heavy drive shaft 15 is not moved axially to the right. Further, an impediment from an internally-splined engine member to axial movement of the drive shaft 15 is not a problem since the drive shaft 15 is not moved.

It is to be noted that connecting plate 23, when not restrained by the locking means 39 within the externally-splined drive shaft 15, can move into the recess 25 of the cup-like flange 17 and the plate splines 27 will remain in partial engagement with the splines 21 of the annular part 20 since the male splines 27 are slightly longer than the clearance travel necessary to separate the curvic teeth 31 and 33. Clearance recess 25 is maintained slightly greater than the required clearance travel by means which will be described so that the drive shaft 15 is prevented from moving toward the driven shaft 11 when the curvic teeth 31 and 33 are separated. Such movement would result in clashing if drive shaft 15 moved connecting plate 23 to the left.

The details of the toggle locking means 39 will now be described. Actuator rod 41 moves in driven shaft 11 and is connected at the enlarged end 37 of the shaft 11 by pin 45 to the left end of an extension 46 of a cam plate 47. Cam rod or extension 46 extends to the right through the tubular part 49 of locking element 51. Cam plate 47 is of general-rectangular shape and is received in a vertical slot formed by two fingers 53 of the fork-shaped locking element 51. One of the plate-like fingers 53 appears. The tubular part 49 of locking element 51 is slidably received in a support or carrier member 55 which is threaded into the flange or input end 37 of the driven shaft 11. A lock washer 57 is threaded on carrier member 55 and abuts the end of driven shaft 11. The left end of the threaded tubular neck or attachment part 59 of the support member 55 confines the left end of a cam return coil spring 61. The other end of return spring 61 is confined by the larger circular shoulder 63 of cam extension 46. Shoulder 63 is slidably mounted in the enlarged part of the driven shaft 11. A smaller circular shoulder 65 confines the left end of a toggle tension spring 67 while the right end abuts the end of the tubular part 49 of the locking element 51.

Locking element 51 has upper and lower radial projections 69 and 70 at the juncture of its two fingers 53 and its tubular part 49. These projections 69 and 70 abut at the left the radially-inner edge part of connecting plate 23 so curvic teeth 31 and 33 are maintained engaged when projections 69 and 70 are fixed axially. Projections 69 and 70 extend out through top and bottom, generally-oval-shaped openings 73 in the cylindrical part of support member 55 extending from neck 59 into drive shaft 15. The side webs 75 of member 55 between openings 73 (one web 75 appearing) extend from the threaded neck 59 and merge into the ring section 77 at the right. A collar 79 is mounted in ring section 77 and is vertically slotted to receive the end of the cam plate 47. Collar 79 and side fingers 53 of locking element 51 having facing semi-circular recesses 81 at each side of cam plate 47 respectively for the right and left elements of toggle links 83 at each side of the cam plate 47, one pair shown. Each pair of toggle links 83 pivot on fulcrum pin 85. Cam plate 47 has an arcuate cam slot 87 adapted to move the toggle fulcrum pin 85 downwardly upon rightward axial movement of the cam plate 47, thus collapsing the toggles 83 and permitting the self-separation of curvic teeth 31 and 33 to move the connecting plate 23 to the right in the splines 21 of the cup-like flange 17. The vertical surfaces of webs 75 of the carrier member 55 confine the toggle links 83 and fulcrum pin 85 at the outer sides thereof and contact fingers 53.

When the curvic teeth 31 and 33 separate, clashing due to movement of connecting plate 23 is prevented by a plurality of spring-biased carbon plungers 89 which are received in an carried by flange 35 and abut the connecting plate 23 inwardly of the curvic teeth 31. Plungers 89 with their springs 90 fully expanded provide spacing means for spacing the connecting plate 23 the clearance travel distance from flange 35. A limit plug 92 is threaded into the right end of drive shaft 15 so that the plug 92 is closely spaced from the end of the carrier member 55 of the locking means 39. Plug 92 is arranged so that, when the curvic teeth 31 and 33 are separated, drive shaft 15 is limited from moving to the left relative driven shaft 11. With this arrangement, drive shaft 15 cannot alter the clearance recess 25 and thus contact connecting plate 23 causing clashing of the curvic teeth 31 and 33.

In normal operation, it is apparent that an engine connected to engine-connecting shaft 15 will transmit torque through curvic teeth 31 and 33 to the splines 13 of driven shaft 11 so that an accessory such as a pump or generator can be operated. Engagement at the curvic teeth 31 and 33 is maintained by the aligned toggles 83 holding the locking projections 69 and 70 against the connecting plate 23 which is splined to engine-connecting shaft 15 so that the plate 23 can move into recess 25 away from driven shaft flange 35 which is axially-fixed. When an accessory malfunctions and disconnect during torque transmission is required, the pilot of the aircraft actuates the operating means (not shown) whereby rightward motion is imparted to the actuator rod 41 of the locking means 39. This action through the connection to the cam plate extension 46 shifts the cam plate 47 to the right causing the collapse of the toggles 83 as the fulcrum pin 85 is moved down. Locking element 51 is thus released and slides to the right. As the locking projections 69 and 70 of locking element 51 move to the right the distance required for clearance travel, the curvic teeth 31 and 33 rapidly disengaged due to their self-separating axially-extending inclined sides and the spacing plungers 89 will follow the face of the connecting plate 23 which moves axially. The engine-connecting shaft 15 thus is not required to move axially within the internally-splined engine output member (not shown). The spacers 89 with springs 90 fully expanded will prevent clashing of the curvic teeth 31 and 33 due to movement of plate 23 when uncoupling has been effected. The limit plug 92 prevents drive shaft 15 from moving to the left to contact plate 23 since plug 92 will abut the end of the locking means 39. The axial dimension of the male splines 27 of the connecting plate 23 is such that engagement with the female splines 21 of the cup-like flange 17 is maintained whereby re-engagement is facilitated when the actuator rod 41 is released and the curvic teeth 31 and 33 are aligned. Return spring 61 urges the cam plate 47 to the left to reposition the locking means 39 with aligned toggles 83 and the locking projections 69 and 70 abut connecting plate 23 to again lock the curvic teeth 31 and 33.

It is to be understood that changes can be made by persons skilled in the art in the disclosed embodiment of the invention without departing the invention as set forth in the appended claims.

What is claimed is:

1. A disconnect device for releasably coupling an engine to a driven accessory comprised of an externally-splined hollow drive shaft having a radially-extending cup-like flange, a driven shaft having a radially-extending flange facing said cup-like flange, said driven shaft flange having curvic teeth projecting toward said cup-like flange, said cup-like flange including an annular part having internal splines, a connecting plate having peripheral splines engaging the internal splines of said annular part of said cup-like flange, said connecting plate having curvic teeth engaging the curvic teeth of said driven shaft flange, said cup-like flange providing clearance travel recess for said connecting plate, releasable locking means carried by said driven shaft and extending into said hollow drive shaft, said locking means contacting said connecting plate and normally maintaining said curvic teeth in engagement, said locking means having actuator means arranged to be moved axially to release said locking means, said locking means having a locking member normally abutting said connecting plate and moveable axially on release of said locking means to permit full separation of said curvic teeth.

2. A disconnect device for releasibly coupling an engine to a driven accessory comprised of an externally-splined hollow drive shaft having a radially-extending cup-like flange, a driven shaft having a radially-extending flange facing said cup-like flange, said driven shaft flange having curvic teeth projecting toward said cup-like flange, said cup-like flange including an annular part having internal splines, a connecting plate having peripheral splines engaging the internal splines of said annular part of said cup-like flange, a split ring mounted in said internal splines abutting the side of said plate adjacent said driven shaft flange, said connecting plate having curvic teeth engaging the curvic teeth of said driven shaft flange, said cup-like flange providing clearance travel recess for said connecting plate, releasible locking means carried by said driven shaft and extending into said drive shaft, said locking means contacting said connecting plate and normally maintaining said curvic teeth in engagement, said locking means having actuator means arranged to be moved axially to release said locking means, said locking means including a pair of releasable toggle links operative to provide clearance travel for said connecting plate as moved axially relative to said drive shaft when said locking means is released and said curvic teeth separate, said connecting plate splines being of such length as to remain engaged with the splines of the cup-like flange of said drive shaft when said curvic teeth separate, spacing means extending between said driven shaft flange and said connecting plate and arranged in relation thereto so that the connecting plate is positioned a distance greater than the curvic teeth clearance travel from said driven shaft flange when said teeth separate.

3. A disconnect device for releasibly coupling an engine to a driven accessory comprised of an externally-splined hollow drive shaft having a radially-extending cup-like flange, a driven shaft having a radially-extending flange facing said cup-like flange, said driven shaft flange having curvic teeth projecting toward said cup-like flange, said cup-like flange including an annular part having internal splines, a connecting plate having peripheral splines engaging the internal splines of said annular part of said cup-like flange, said connecting plate having curvic teeth engaging the curvic teeth of said driven shaft flange, said cup-like flange providing clearance travel recess for said connecting plate, releasible locking means carried by said driven shaft and extending into said drive shaft, said locking means contacting said connecting plate and normally maintaining said curvic teeth in engagement, said locking means having actuator means arranged to be moved axially to release said locking means, said locking means including a pair of releasable toggle links operative to provide clearance travel for said connecting plate as moved axially relative to said drive shaft when said locking means is released and said curvic teeth separate, said locking means including a support member attached to said driven shaft and extending into said drive shaft, said drive shaft having a limit plug threaded in the end opposite its flange and closely spaced from the end of said support member so that the axial spacing between said drive shaft and said driven shaft is limited to provide for clearance travel of said connecting plate.

4. A releasible coupling comprised of a hollow drive shaft having external splines for connection to an engine, a driven shaft having a radial flange facing said drive shaft, said drive shaft having a cup-like flange, said drive shaft flange having an annular part extending toward said driven shaft flange and providing a clearance recess, said annular part having internal splines, a flat connecting plate having peripheral splines mounted on the splines of said annular part, said driven shaft flange and connecting plate having mating teeth, said teeth urged into engagement, locking means carried by said driven shaft and extending into said hollow drive shaft, said locking means normally urging said connecting plate toward said driven shaft, said locking means being releasible and arranged to move axially so that said teeth will separate moving said connecting plate away from said driven shaft into said recess.

5. A releasible coupling comprised of a hollow drive shaft having external splines for connection to an engine, a driven shaft having a radial flange facing said drive shaft, said drive shaft having a cup-like flange, said drive shaft flange having an annular part extending toward said driven shaft flange and providing a clearance recess, said annular part having internal splines, a flat connecting plate having peripheral splines mounted on the splines of said annular part, said driven shaft flange and said connecting plate having mating teeth, said teeth urged into engagement, locking means carried by said driven shaft and extending into said drive shaft, said locking means normally urging said connecting plate toward said driven shaft, said locking means including a releasible latch device and an actuator rod device, said rod device being operably connected to said latch device, said actuator rod device being arranged to move axially so that said latch device is released and said teeth will separate moving said connecting plate away from said driven shaft into said recess, spacing means extending between said driven shaft flange and said connecting plate constructed to space said connecting plate away from said driven shaft flange so that said teeth remain out of contact when said teeth are disengaged, a split lock ring mounted in the splines of said annular part of said drive shaft flange arranged to contain said connecting plate, said connecting plate splines being longer than said annular part splines inward of said lock ring, said drive shaft having a limit plug threaded in the end opposite said cup-like flange, said limit plug being adjacent the end of said locking means so that said drive shaft will be prevented from moving toward said driven shaft when disconnected whereby said clearance recess remains above a minimum depth.

6. A releasible coupling comprised of a hollow drive shaft having external splines for connection to an engine, a hollow driven shaft having a radial flange facing said drive shaft, said drive shaft having a cup-like flange, said drive shaft flange having an annular part extending toward said driven shaft flange and providing a clearance recess, said annular part having internal splines, a flat connecting plate having peripheral splines mounted on the splines of said annular part, said driven shaft flange and said connecting plate having mating teeth which have inclined axially-extending sides, said teeth urged into engagement, locking means carried by said driven shaft and extending into said drive shaft, said locking means normally urging said connecting plate toward said driven shaft, said locking means including a releasible latch device and an actuator rod device, said rod device being operably connected to said latch device and extending along the axis of said driven shaft, said actuator rod device being arranged to move axially so that said latch device is released and said teeth will separate moving said connecting plate away from said driven shaft into said recess, spacing means extending between said driven shaft flange and said connecting plate constructed to space said connecting plate from said driven shaft flange so that said teeth remain out of contact when said teeth are disengaged, said latch device including a cam plate having an arcuate slot and toggles having a fulcrum pin received in said slot, said toggles being normally axially-aligned with said rod device, said cam plate being axially connected to said rod device and being constructed to collapse said toggles when moved by said rod device, said latch device including an axially-movable locking element slidably mounted and normally urged against said connecting plate by said axially-aligned toggles to maintain engagement of said teeth, a split lock ring mounted in the splines of said annular part of said drive shaft flange arranged to contain said connecting plate, said connecting plate splines being longer than said annular part splines inward of said lock ring, said driven shaft having a limit plug threaded in the end opposite said cup-like flange, said limit plug being adjacent the end of said locking means so that said drive shaft will be prevented from moving toward said driven shaft when disconnected.

References Cited in the file of this patent
UNITED STATES PATENTS

| 452,431 | Richards | May 19, 1891 |
|---|---|---|
| 2,633,218 | Pielstick | Mar. 31, 1953 |
| 2,704,646 | Vogel | Mar. 22, 1955 |